United States Patent
Tejpal

(10) Patent No.: US 12,129,044 B2
(45) Date of Patent: Oct. 29, 2024

(54) COOLING ARCHITECTURE FOR HYDROGEN FUEL CELL-POWERED AIRCRAFT

(71) Applicant: ZeroAvia, Inc., Hollister, CA (US)

(72) Inventor: Ritish Tejpal, Coventry (GB)

(73) Assignee: ZeroAvia, Inc., Hollister, CA (US)

( * ) Notice: Subject to any disclaimer, the term of this patent is extended or adjusted under 35 U.S.C. 154(b) by 153 days.

(21) Appl. No.: 17/662,405

(22) Filed: May 6, 2022

(65) Prior Publication Data

US 2022/0371741 A1 Nov. 24, 2022

Related U.S. Application Data

(60) Provisional application No. 63/185,512, filed on May 7, 2021.

(51) Int. Cl.

| | | |
|---|---|---|
| *B64D 33/10* | (2006.01) | |
| *B60L 58/33* | (2019.01) | |
| *B64D 27/02* | (2006.01) | |
| *B64D 27/24* | (2024.01) | |
| *B64D 41/00* | (2006.01) | |
| *G01K 13/00* | (2021.01) | |
| *H01M 8/04007* | (2016.01) | |
| *H01M 8/04014* | (2016.01) | |
| *H01M 8/04111* | (2016.01) | |
| *H01M 8/0432* | (2016.01) | |
| *H01M 8/04746* | (2016.01) | |

(52) U.S. Cl.
CPC .............. *B64D 33/10* (2013.01); *B60L 58/33* (2019.02); *B64D 27/24* (2013.01); *B64D 41/00* (2013.01); *G01K 13/00* (2013.01); *H01M 8/04014* (2013.01); *H01M 8/04074* (2013.01); *H01M 8/04111* (2013.01); *H01M 8/0432* (2013.01); *H01M 8/04768* (2013.01); *H01M 8/04776* (2013.01); *B64D 27/026* (2024.01); *B64D 2041/005* (2013.01); *H01M 2250/20* (2013.01)

(58) Field of Classification Search
CPC ........ B64D 33/10; B64D 27/24; B64D 33/08; B60L 58/33; H01M 8/04768; H01M 2250/20; H01M 8/04074
See application file for complete search history.

(56) References Cited

U.S. PATENT DOCUMENTS

| | | | |
|---|---|---|---|
| 2004/0040312 A1* | 3/2004 | Hoffjann | H01M 8/04089 60/784 |
| 2019/0006686 A1* | 1/2019 | Carralero | B63H 21/00 |

(Continued)

*Primary Examiner* — Michael C Zarroli
*Assistant Examiner* — Peter A Taraschi
(74) *Attorney, Agent, or Firm* — Osha Bergman Watanabe & Burton LLP

(57) ABSTRACT

A cooling architecture for an integrated hydrogen-electric engine having a radiator and a hydrogen fuel cell includes a t and a manifold. The turbine is disposed in fluid communication with the hydrogen fuel cell. The turbine is configured to compress a predetermined amount of air and direct a first portion of the predetermined amount of the compressed air to the fuel cell for generating electricity that powers the integrated hydrogen-electric engine. The manifold is disposed in fluid communication with the turbine and positioned to direct a second portion of the predetermined amount of compressed air to the radiator for removing heat from the radiator.

20 Claims, 5 Drawing Sheets

(56) References Cited

U.S. PATENT DOCUMENTS

| | | | |
|---|---|---|---|
| 2019/0148751 A1* | 5/2019 | Kozuka | H01M 8/04626 |
| | | | 429/434 |
| 2020/0075971 A1* | 3/2020 | Lo | H01M 8/04708 |
| 2020/0185733 A1* | 6/2020 | Ryu | H01M 8/04029 |
| 2020/0340403 A1* | 10/2020 | Bartosz | B64D 41/00 |
| 2021/0009280 A1* | 1/2021 | Poirier | B64D 27/24 |
| 2021/0020966 A1* | 1/2021 | Yamaue | H01M 8/04074 |
| 2021/0111419 A1* | 4/2021 | Itou | B60L 58/12 |

* cited by examiner

COOLING ARCHITECTURE FOR HYDROGEN FUEL CELL-POWERED AIRCRAFT

CROSS-REFERENCE TO RELATED APPLICATIONS (PROVISIONAL)

This application claims priority to and the benefit of co-pending U.S. Provisional Patent Application 63/185,512 filed on May 7, 2021, entitled "COOLING ARCHITECTURE FOR HYDROGEN FUEL CELL-POWERED AIRCRAFT" by Ritish Tejpal, and assigned to the assignee of the present application, the disclosure of which is hereby incorporated by reference in its entirety.

FIELD

The present disclosure relates generally to cooling architecture in hydrogen fuel cell-powered aircraft and, more specifically, to systems and methods for routing compressed air in hydrogen fuel cell-powered aircraft.

BACKGROUND

In the commercial aviation market, the high maintenance and fuel costs for traditional turbine engines are principal drivers of operating costs for commercial airlines, aircraft industries, and other turbine-engine operators (e.g., power utilities). Turbine engines burn carbon-emitting fossil fuels and operate at high speed and high heat requiring expensive maintenance. The continued growth of fossil fuel aviation is increasingly contributing to increased global pollution and is reliant on fossil fuel extraction that is increasingly scrutinized for its pollution potential. Additionally, traditional gas turbines have a loud noise footprint, which may be a nuisance in densely populated areas or to wildlife. Thus, there is a need for aircraft that are powered via engines that use alternative fuels and power generation methods, such as hydrogen fuel cells.

One of the challenges in implementing hydrogen fuel cells in aircraft is managing the thermal requirements of hydrogen fuel cells. Existing thermal management systems for traditional turbine engines do not meet the needs of hydrogen fuel cells, and there is a need for developing thermal management systems and cooling architectures for hydrogen fuel cell aircraft.

SUMMARY

This disclosure details a highly integrated hydrogen-electric engine that reduces aircraft noise and heat signatures, improves component reliability, increases the useful life of the engine, limits environmental pollution, and decreases the probability of failure per hour of operation. In particular, this disclosure details a cooling architecture for an integrated hydrogen-electric engine with a multi-stage compressor that utilizes compressed air and compressed hydrogen to produce electricity for running motors and delivering useful mechanical power to a propulsor (e.g., a fan or propeller). Part of the generated power can be utilized to drive the multi-stage compressor and deliver very high-power density. Indeed, the disclosed integrated hydrogen-electric engine can deliver similar power density that modern jet engines deliver (e.g., 6-8 kW/kg), and at a precompression ratio of 30+ (common in today's turbofan engines). The disclosed cooling architecture provides additional or complementary cooling paths in which compressed air can be routed to select aircraft components such as an aircraft radiator for improving efficiency thereof.

In aspects, a cooling architecture for an integrated hydrogen-electric engine having a radiator and a hydrogen fuel cell includes a turbine and a manifold. The turbine is disposed in fluid communication with the hydrogen fuel cell. The turbine is configured to compress a predetermined amount of air and direct a first portion of the predetermined amount of the compressed air to the fuel cell for generating electricity that powers the integrated hydrogen-electric engine. The manifold is disposed in fluid communication with the turbine and positioned to direct a second portion of the predetermined amount of compressed air to the radiator for removing heat from the radiator.

In aspects, the manifold may be further configured to direct a third portion of the predetermined amount of compressed air to a selected aircraft component for removing heat from the selected aircraft component.

In aspects, the selected aircraft component may be at least one of a fuel cell stack, a motor, a controller, an inverter, a pump, or a heat exchanger.

In aspects, the manifold may further include at least one regulating valve configured to increase, decrease, or maintain the second portion of the predetermined amount of the compressed air.

In aspects, the cooling architecture may include a sensor configured to monitor a temperature of the radiator. The cooling architecture may also include controller having a processor and a memory with instructions stored thereon, which, when executed by the processor, cause the regulating valves to increase, decrease or maintain the second portion of the predetermined amount of compressed air to maintain the radiator within a predetermined temperature operating range.

In aspects, the manifold may further include a manifold fan configured to increase a flow rate of the second portion of the predetermined amount of compressed air.

This disclosure also provides a method of operating an integrated hydrogen electric engine aircraft. The method includes: operating a fuel cell-powered electric engine system to power the aircraft; compressing a predetermined amount of air via a turbine; driving a first portion of the predetermined amount of air toward a fuel cell stack of the fuel cell powered electric engine system for generating electricity for powering a motor of the fuel cell-powered electric engine system; and driving a second portion of the predetermined amount of compressed air via a manifold toward a radiator configured to remove heat from the fuel cell stack.

In aspects, the method may include driving a third portion of the predetermined amount of compressed air via a manifold toward a selected aircraft component.

In aspects, the method may include sensing a temperature of the fuel cell stack; sensing a temperature of the radiator; and/or sensing a temperature of the selected aircraft component.

In aspects, the method may include operating at least one regulating valve of the manifold to increase, decrease, or maintain the second or third portions of the predetermined amount of compressed air to maintain the radiator or selected aircraft component, respectively, within a predetermined temperature operating range of the radiator or selected aircraft component.

In aspects, the method may include operating a manifold fan to increase a flow rate of the second portion of the predetermined amount of air.

In aspects, the method may include cooling the radiator via the second portion of the predetermined amount of compressed air.

In aspects, the method may include cooling the selected aircraft component via the third portion of the predetermined amount of compressed air.

In accordance with other aspects, this disclosure further provides an integrated hydrogen-electric engine. The integrated hydrogen electric engine includes: a compressor system configured to compress air; a hydrogen fuel source; a fuel cell stack; a heat exchanger in fluid communication with the hydrogen fuel source and the fuel cell stack; a radiator coupled to at least one of the heat exchanger or the fuel cell stack; an elongated shaft supporting the compressor system, the fuel cell stack, and the heat exchanger; a motor assembly disposed in electrical communication with the fuel cell stack; and a manifold in fluid communication with the compressor system, the manifold configured to direct a first portion of compressed air from the compressor system to at least one of the radiator, the fuel cell stack, or the heat exchanger.

In aspects, the manifold includes a plurality of conduits, at least one conduit of the plurality of conduits is configured to direct a portion of air towards the radiator to enable cooling thereof.

BRIEF DESCRIPTION OF THE DRAWINGS

The present disclosure will become more readily apparent from the specific description accompanied by the following drawings, in which.

DETAILED DESCRIPTION

Figure 1:
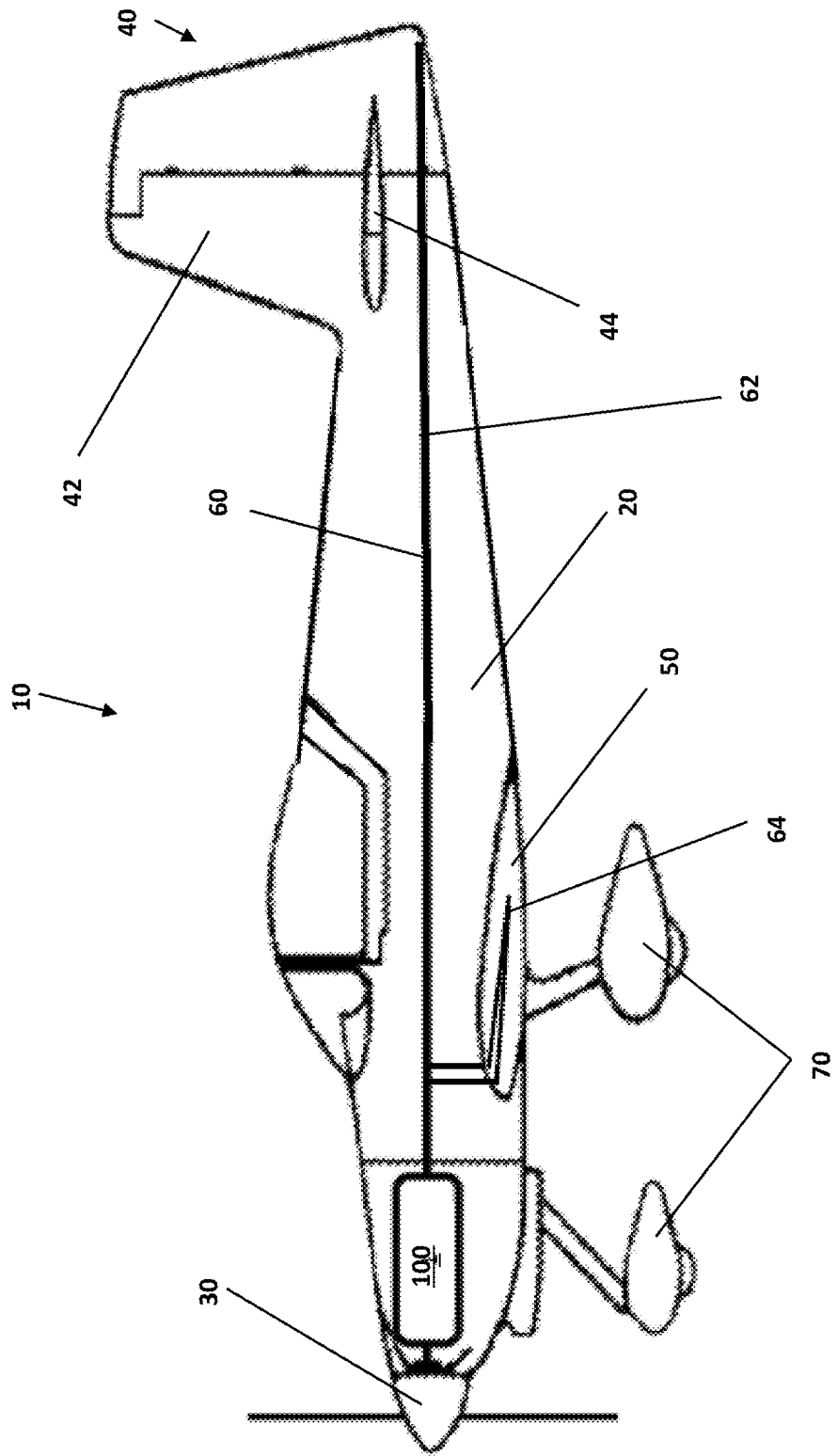
FIG. 1 is a perspective view of an exemplary integrated hydrogen-electric powered aircraft.

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing aspects by way of example only and is not intended to be limiting of the claimed disclosure.

As used herein, the singular forms "a," "an," and "the" include the plural form, and reference to a particular numerical value includes at least that value, unless the context clearly dictates otherwise. Ranges may be expressed herein as from "about" or "approximately" one value and/or to "about" or "approximately" another particular value. When such a range is expressed, another aspect includes from the one value and/or to the other particular value. Similarly, when values are expressed as approximations, by use of the antecedent "about," it will be understood that the value forms another aspect. Further, terms including "approximately," "about," "substantially," and the like, as utilized herein, are meant to encompass variations and/or tolerances up to and including plus or minus 10 percent. It should also be understood that all spatial references, such as, for example, horizontal, vertical, top, upper, lower, bottom, left and right, are for illustrative purposes only and can be varied within the scope of the disclosure. For example, the references "top" and "bottom" are relative and used only in the context to the other and are not necessarily "superior" and "inferior." Any or all of the aspects described herein, to the extent consistent, may be used in conjunction with any or all of the other aspects described herein.

In the following description, well-known functions or constructions are not described in detail to avoid obscuring the present disclosure in unnecessary detail.

This disclosure provides systems and methods for thermal management of hydrogen fuel cell engines (e.g., turbines) for aircraft. Thermal management of hydrogen fuel cell technology in aircraft design has unique challenges not solved by thermal management systems of traditional gas powered turbines. The mechanical, electronic, fluidic, and thermal systems of hydrogen fuel cell-powered aircraft need to be properly engineered to provide appropriate power, efficiency, safety, and physical characteristics.

As is generally known, heat can reduce operational efficiencies and life span of an engine or engine components. Engine components that are cooled (thus operating at lower temperatures) may last longer and/or may operate more efficiently than engine or engine components operating at higher temperatures. The cooling architecture of this disclosure includes one or more fluid communication paths via one or more conduits of a manifold and may include passive cooling arrangements and/or active cooling arrangements. These fluid communication paths may direct fluids, such as intake air, into and/or across selected internal aircraft components that may require cooling or additional cooling, e.g., a radiator in fluid communication with a heat exchanger.

Referring to FIG. 1, an integrated hydrogen-electric powered aircraft 10 includes a fuselage 20, a propulsor 30 (e.g., a fan or propeller) disposed at a forward end of fuselage 20, a tail 40 disposed at a rear end of fuselage 20, a vertical stabilizer 42 and a pair of horizontal stabilizers 44 (only one of which is shown) extending outwardly from either side of tail 40, a pair of wings 50 (only one of which is shown) extending outwardly from either side of fuselage 20, an exhaust system 60 including a fuselage portion 62 and/or a wing portion 64, a pair of wheel assemblies 70 (e.g., landing gear), a hydrogen fuel cell-powered electric engine system 100 (e.g., a hydrogen-electric engine system (HEES) 100), and a cooling architecture system 200.

Figure 2:
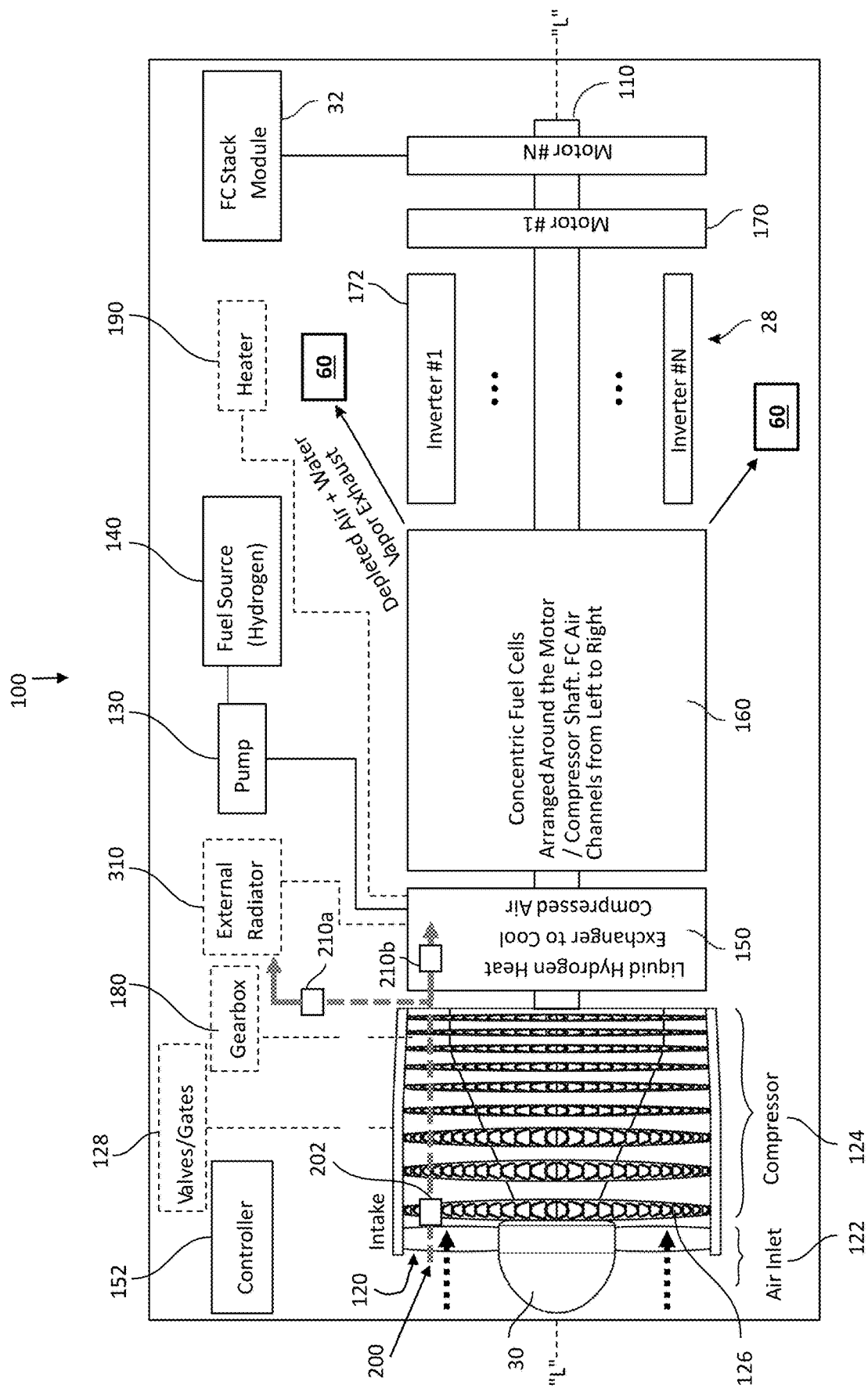
FIG. 2 is a schematic view of a fuel cell of the integrated hydrogen fuel cell-electric engine system of the aircraft of FIG. 1.

FIG. 2 illustrates an exemplary integrated hydrogen-electric engine system (HEES) 100 that can be utilized, for example, in a turboprop or turbofan system, to provide a streamlined, light weight, power dense, and efficient system. In general, HEES 100 includes an elongated shaft 110 that defines a longitudinal axis "L" and extends through the entire powertrain of HEES 100 to function as a common shaft for the various components of the powertrain. Elongated shaft 110 supports propulsor 30 (e.g., a fan or propeller), an air compressor system 120, a pump 130 in fluid communication with a fuel source 140 carrying a fuel (e.g., liquid hydrogen), a heat exchanger 150 in fluid communication with air compressor system 120, a fuel cell stack 160 in fluid communication with heat exchanger 150, and a motor assembly 170 disposed in electrical communication with fuel cell stack 160.

Air compressor system 120 of HEES 100 includes an air inlet portion 122 at a distal end thereof and a compressor portion 124 that is disposed proximally of air inlet portion 122 for uninterrupted, axial delivery of air flow in the proximal direction. Compressor portion 124 supports a plurality of longitudinally spaced-apart rotatable compressor wheels 126 (e.g., multi-stage rotors) that rotate in response to rotation of elongated shaft 110 for compressing air received through air inlet portion 122 for pushing the compressed air to a fuel cell stack 160 for conversion to electrical energy. As can be appreciated, the number of compressor wheels 126 (e.g., the number of stages) and/or diameter, longitudinal spacing, and/or configuration thereof can be modified as desired to change the amount of air supply needed for a pre-determined power requirement. The amount of air supplied to the fuel cell stack 160 is greater the higher the power requirements are, and the higher the power requirements are, the bigger the propulsor 30 should be. These compressor wheels 126 can be implemented as axial or centrifugal compressor stages. Further, the compressor portion 124 can have one or more bypass valves and/or wastegates 128 to regulate the pressure and flow of the air that enters the downstream fuel cell stack 160, as well as to manage the cold air supply to any auxiliary heat exchangers in the system.

Air compressor system 120 of HEES 100 can optionally be mechanically coupled to elongated shaft 110 via a gearbox 180 to change (increase and/or decrease) compressor turbine rotations per minute (RPM) and to change the air flow to fuel cell stack 160. For instance, gearbox 180 can be configured to enable the air flow, or portions thereof, to be exhausted for controlling a rate of air flow through the fuel cell stack 160, and thus, controlling the output power.

HEES 100 further includes a gas management system such as a heat exchanger 150 disposed concentrically about elongated shaft 110 and configured to control thermal and/or humidity characteristics of the compressed air from air compressor system 120 for conditioning the compressed air before entering fuel cell stack 160. HEES 100 further also includes a fuel source 140 of fuel cryogenic (e.g., liquid hydrogen — LH2, or cold hydrogen gas) that is operatively coupled to heat exchanger 150 via a pump 130 configured to pump the fuel from fuel source 140 to heat exchanger 150 for conditioning compressed air. In particular, the fuel, while in the heat exchanger 150, becomes gasified because of heating (e.g., liquid hydrogen converts to gas) to remove the heat from the compressed air. The hydrogen gas is then heated in the heat exchanger 150 to a working temperature of the fuel cell stack 160 which also removes heat from the compressed air, resulting in a control of flow through the heat exchanger 150. In aspects, a heater 190 can be coupled to or included with heat exchanger 150 to increase heat as necessary, for instance, when running under a low power regime. Additionally, and/or alternatively, motor assembly 170 can be coupled to heat exchanger 150 for looping in the cooling/heating loops from motor assembly 170 as necessary. Such heating/cooling control can be managed, for instance, via controller 152 of HEES 100. In embodiments, fuel source 140 can be disposed in fluid communication with motor assembly 170 or any other suitable component to facilitate cooling of such components.

Pump 130 of HEES 100 can also be coaxially supported on elongated shaft 110 for actuation thereof in response to rotation of elongated shaft 110. Heat exchanger 150 is configured to cool the compressed air received from air compressor system 120 with the assistance of the pumped liquid hydrogen from the fuel source 140.

Figure 3:
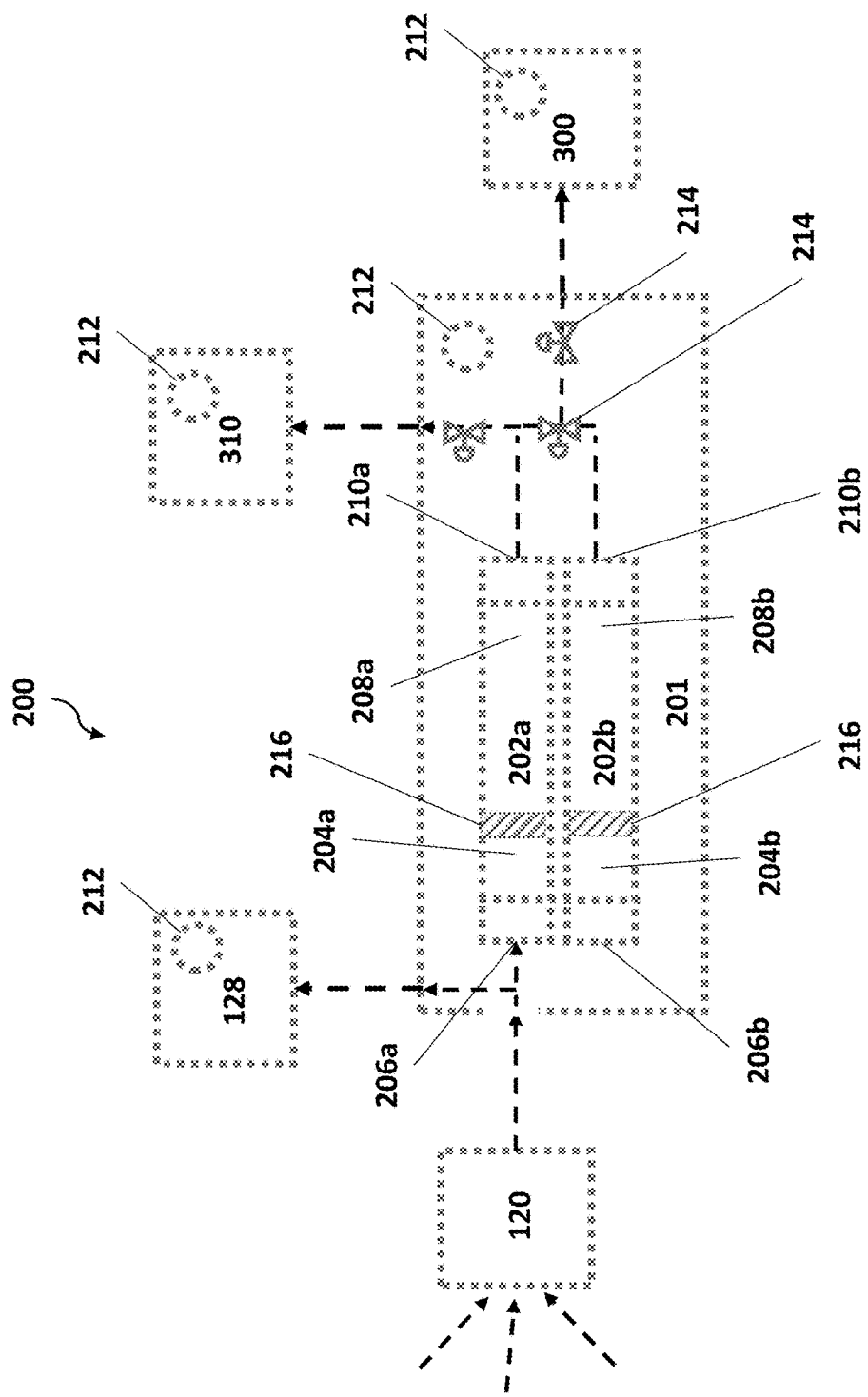
FIG. 3 is a schematic representation of a cooling architecture of the hydrogen fuel cell-electric engine system of FIG. 2 for cooling aircraft components of the aircraft of FIG. 1.

Referring to FIGS. 2 and 3, cooling architecture 200 of HEES 100 is configured to route air or compressed air to one or more selected aircraft components 300. Cooling architecture 200 includes a manifold 201 which is disposed about HEES 100 of the integrated hydrogen-electric powered aircraft 10. Generally, the manifold 201 is configured to direct some compressed air from the compressor system 120 of the HEES 100 towards a selected aircraft component 300, such as an external radiator 310, for cooling the selected aircraft component 300 while also providing compressed air to the HEES 100 for generating electricity via fuel cell stack 160. In aspects, the bypass valve and/or wastegates 128 are in fluid communication with manifold 201 and may form a portion of manifold 201.

Manifold 201 of cooling architecture 200 is configured to drive compressed air from air compressor system 120 towards a selected aircraft component 300 (e.g., fuel cell stack 160, heater 190, electronics such as controller 152, motor assembly 170, or inverter 172) and/or external radiator 310. Manifold 201 may define a single conduit or a plurality of conduits which extend(s) from one or more inlets (e.g., a central valve or opening), to enable fluid communication between the air compressor system 120 and selected aircraft component 300 and/or external radiator 310.

Manifold 201 of cooling architecture 200 includes a first conduit 202*a* having a first end 204*a* including a first inlet 206*a* and a second end 208*a* including a first outlet 210*a*. The first inlet 206*a* may define a first inlet diameter (not shown) and the first outlet 210*a* may define a first outlet diameter (not shown). In aspects, the first inlet 206*a* may be substantially similar (e.g., similar diameter) to the first outlet 210*a*. The first inlet 206*a* is configured to securely connect the first end of the conduit 202*a* to the air compressor system 120. The first outlet 210*a* is configured to securely connect the second end 208*a* of the first conduit 202*a* to one or more radiators of HEES 100, such as external radiator 310 or one or more radiators of the fuel cell stack 160, to enable fluid communication thereto. Alternatively, the first outlet 210*a* may be configured to securely couple to a portion of the HEES 100 located adjacent to the external radiator 310 such that air dispensed from the first outlet 210*a* flows across the radiator 310 for providing additional cooling thereto. In aspects, fasteners such as bolts and screws, or any other suitable fasteners may be used to secure the manifold 201 to the HEES 100.

In aspects, the manifold 201 of cooling architecture 200 may further include a second conduit 202*b*, similar to conduit 202*a*, having a first end 204*b* including a first inlet 206*b*, and a second end 208*b* including a first outlet 210*b*. The second conduit 202*b* is configured to direct air towards a selected aircraft component 300 and/or external radiator 310. The first and second conduits 202*a*, 202*b*, may each include a regulating valve 214 to separately control where fluid flowing therethrough is communicated. For example, the valves may be configured to enable fluid from both the first and second conduits 202*a*, 202*b* to flow to the external radiator and selected aircraft component 300, or for one of the first and second conduits 202*a*, 202*b*, to flow to either the external radiator 310 or the selected aircraft component 300, and the other of the first and second conduit 202*a*, 202*b* to the other of the external radiator 310 or the selected aircraft component 300.

The manifold 201 of cooling architecture 200 is configured to direct compressed air from compressor 124 or air from air inlet 122 towards one or more radiators in fluid communication with a heat exchanger (e.g., heat exchanger 150, or a radiator coupled to a liquid coolant system routed throughout HEES 100). Thus, manifold 201 eliminates the need for any radiator fans that would otherwise force air over the radiator (e.g., external radiator 310, or radiators disposed within or about heat exchanger 150).

In aspects, the manifold 201 of cooling architecture 200 includes one or more sensors 212 and one or more regulating valves 214. Sensors 212 may be thermocouples, infrared heat sensors, resistive temperature measuring devices, or other heat sensors configured to monitor a temperature of the selected aircraft component 300, external radiator 310, or a temperature of the air flowing through manifold 201. Sensors 212 and regulating valves 214 may be in communication with controller 152. The regulating valves 214 are configured to control the amount of air flowing to the selected aircraft component 300 or the external radiator 310 as described above. The regulating valves 214 may each be discretely controlled (e.g., separately or together) to restrict or increase an amount of air flowing to the selected aircraft component 300 or external radiator 310 depending on a desired temperature operating range of the selected aircraft component 300 or external radiator 310. Controller 152, via sensors 212, monitors the temperature of the selected aircraft component 300 or external radiator 310 and controls each regulating valve 214 to restrict or increase fluid flow therethrough to cool the selected aircraft component 300 or external radiator 310. Thus, manifold 201 is configured to maintain the external radiator 310 or selected aircraft component 300 within a desired operating temperature range.

The amount of air supplied by the manifold 201 of cooling architecture 200 to the selected aircraft component 300 or the external radiator 310 may be proportional to a desired motor speed, thrust, and/or lift, and therefore, proportional to an amount of electricity generated by fuel cell stack 160 to power motor 170 and other electrical components. For example, during takeoff of integrated hydrogen electric-powered aircraft 10 more electricity is needed for the motor to produce the necessary thrust. As more electricity is generated by the fuel cell stack 160, more energy in the form of heat is generated, and thus manifold 201 directs more compressed air to the radiators in the fuel cell stack 160 or to external radiator 310 to remove the excess heat. Similarly, during a turning maneuver of the integrated hydrogen electric powered aircraft 10 or during landing, if more electricity is needed and therefore more heat produced, manifold 201 may redirect more air from the compressor 124 to the external radiator 310 or selected aircraft component 300.

Manifold 201 of cooling architecture 200 may include one or more manifold fans 216 in fluid communication with one or more conduits of manifold 201 (e.g., first and second conduits 202a, 202b). The manifold fans 216 are configured to increase the mass flow rate or speed of the air or compressed air flowing to the external radiator 310 or selected aircraft component 300. In aspects, while HEES 100 is operating at low speeds, low altitude, or otherwise warmer environments where a temperature differential between the free-stream air and the various components of HEES 100 is smaller than desired, the manifold fans 216 increase the mass flow rate of the air to increase the cooling capacity or heat transfer between the selected aircraft component 300 or external radiator 310 and the air supplied thereto.

In aspects, the manifold 201 of cooling architecture 200 may include strong and durable materials such as composites (e.g., carbon-fiber) or metals (e.g., cast iron). In some aspects, the manifold 201 may include one or more coatings to prevent air leakage.

Figure 4:
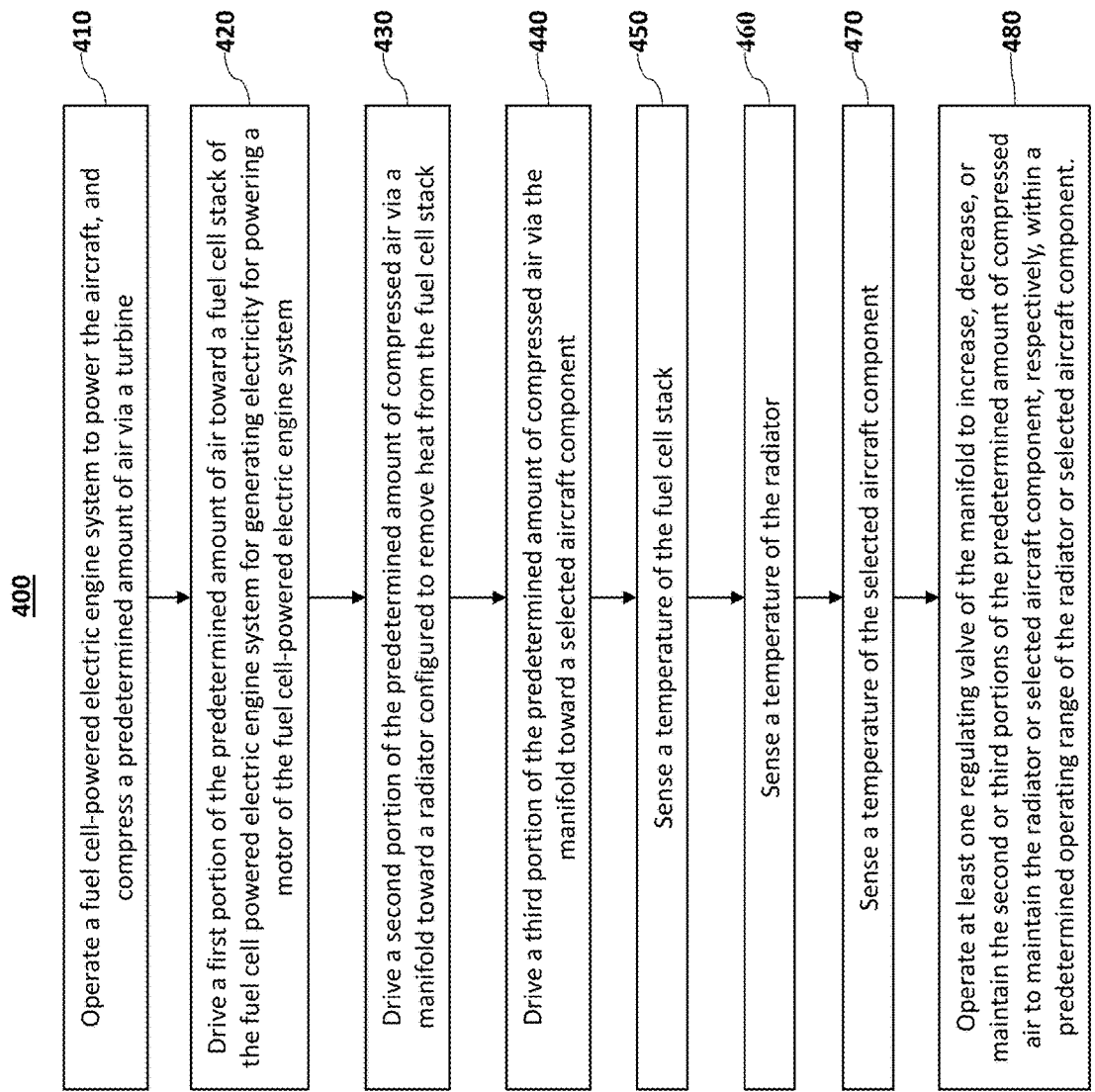
FIG. 4 is a diagram of a method for cooling a hydrogen fuel cell electric engine system.

With reference to FIG. 4, a method 400 for operating the hydrogen-electric powered aircraft 10 having the cooling architecture 200 described above is shown. Persons skilled in the art will appreciate that one or more operations of the method 400 may be performed in a different order, repeated, and/or omitted without departing from the scope of the disclosure. At operation 410, fuel cell-powered electric engine system (e.g., HEES 100) is operated to power the aircraft 10 and compress a predetermined amount of air via a turbine (e.g., air compressor system 120 coupled to elongated shaft 110). At operation 420, a first portion of the predetermined amount of air is driven toward a fuel cell stack 160 of HEES 100 for generating electricity for powering a motor 170 of the HEES 100. At operation 430, a second portion of the predetermined amount of compressed air is driven via a manifold 201 toward a radiator 310 configured to remove heat from the fuel cell stack 160. In aspects, at operation 440, a third portion of the predetermined amount of compressed air may be driven via the manifold 201 toward a selected aircraft component 300. In aspects, at operations 450, 460, and 470, a temperature of the fuel cell stack 160, radiator 310, and/or selected aircraft component 300 may be sensed. In aspects, at operation 480, at least one regulating valve 212 of the manifold 201 is operated to increase, decrease, or maintain the second or third portions of the predetermined amount of compressed air to maintain the radiator 310 or selected aircraft component 300, respectively, within a predetermined operating range of the radiator 310 or selected aircraft component 300.

Figure 5:
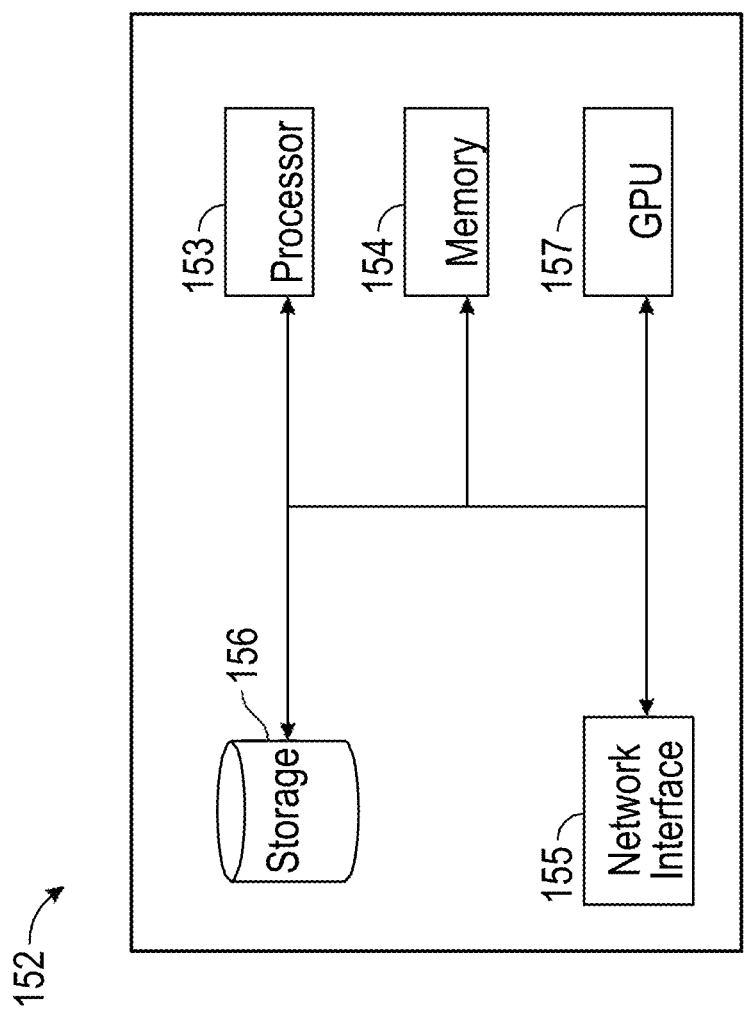
FIG. 5 is a diagram of a controller of the hydrogen fuel cell-electric engine system of FIG. 2.

FIG. 5 illustrates that controller 152 of integrated hydrogen electric-powered aircraft 10 includes a processor 153 connected to a computer-readable storage medium or a memory 154. The computer-readable storage medium or memory 154 may be a volatile type memory, e.g., RAM, or a non-volatile type memory, e.g., flash media, disk media, etc. In various aspects of the disclosure, the processor 153 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 154 can be random access memory, read-only memory, magnetic disk memory, solid-state memory, optical disc memory, and/or another type of memory. In some aspects of the disclosure, the memory 154 can be separate from the controller 152 and can communicate with the processor 153 through communication buses of a circuit board and/or through communication cables such as serial ATA cables or other types of cables. The memory 154 includes computer-readable instructions that are executable by the processor 153 to operate the controller 152. In other aspects of the disclosure, the controller 152 may include a network interface 155 to communicate with other computers or to a server. A storage device 156 may be used for storing data.

The disclosed method may run on the controller 152 or on a user device, including, for example, on a mobile device, an IoT device, or a server system.

The controller 152 is configured to receive among other data, the fuel supply status, aircraft location, and control, among other features, the pumps, motors, sensors, etc.

Further, as can be appreciated, the integrated hydrogen-electric engine system (HEES) 100 can include any number and/or type of sensors, electrical components, and/or telemetry devices that are operatively coupled to controller 152 for facilitating the control, operation, and/or input/out of the various components of HEES 100 for improving efficiencies and/or determining errors and/or failures of the various components.

It should be understood that the disclosed structure can include any suitable mechanical, electrical, and/or chemical components for operating the disclosed system or components thereof. For instance, such electrical components can include, for example, any suitable electrical and/or electro-mechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetB SD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various aspects, the memory can be random access memory, read-only memory, magnetic disk memory, solid state memory, optical disc memory, and/or another type of memory. In various aspects, the memory can be separate from the controller and can communicate with the processor through communication buses of a circuit board and/or through communication cables such as serial ATA cables or other types of cables. The memory includes computer-readable instructions that are executable by the processor to operate the controller. In various aspects, the controller may include a wireless network interface to communicate with other computers or a server. In aspects, a storage device may be used for storing data In various aspects, the processor may be, for example, without limitation, a digital signal processor, a microprocessor, an ASIC, a graphics processing unit 157 ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In aspects where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A cooling architecture for an integrated hydrogen-electric engine including a radiator and a hydrogen fuel cell, the cooling architecture comprising:
   a turbine disposed in fluid communication with the hydrogen fuel cell, the turbine configured to compress a predetermined amount of air and direct a first portion of the predetermined amount of the compressed air to the hydrogen fuel cell for generating electricity that powers the integrated hydrogen-electric engine; and
   a manifold disposed in fluid communication with the turbine and positioned to transport a second portion of the predetermined amount of compressed air directly from the turbine to the radiator for removing heat from the radiator.

2. The cooling architecture of claim 1, wherein the manifold is further configured to transport a third portion of the predetermined amount of compressed air directly from the turbine to a selected aircraft component for removing heat from the selected aircraft component.

3. The cooling architecture of claim 2, wherein the selected aircraft component is at least one of: a fuel cell stack, a motor, a controller, an inverter, a pump, or a heat exchanger.

4. The cooling architecture of claim 1, wherein the manifold further includes at least one regulating valve configured to, at least, decrease the second portion of the predetermined amount of the compressed air.

5. The cooling architecture of claim 4, further including:
   a sensor configured to monitor a temperature of the radiator; and
   a controller having a processor and a memory with instructions stored thereon, which, when executed by the processor, cause the regulating valves to, at least, decrease the second portion of the predetermined amount of compressed air to maintain the radiator within a predetermined temperature operating range.

6. The cooling architecture of claim 1, further including:
   a sensor configured to monitor a temperature of the radiator; and
   a controller having a processor and a memory with instructions stored thereon, which, when executed by the processor, cause regulating valves in fluid communication with the manifold to, at least, decrease the second portion of the predetermined amount of compressed air to maintain the radiator within a predetermined temperature operating range.

7. The cooling architecture of claim 1, the manifold further includes a manifold fan configured to increase a flow rate of the second portion of the predetermined amount of compressed air.

8. A method of operating an integrated hydrogen electric engine aircraft, the method comprising:
   operating a fuel cell powered electric engine system to power a motor;
   compressing a predetermined amount of air via a turbine;
   driving a first portion of the predetermined amount of air toward a fuel cell stack of the fuel cell powered electric engine system for generating electricity for powering a motor of the fuel cell-powered electric engine system; and
   driving a second portion of the predetermined amount of compressed air directly from the turbine via a manifold to a radiator configured to remove heat from the fuel cell stack.

9. The method of claim 8, further comprising driving a third portion of the predetermined amount of compressed air directly from the turbine via a manifold toward a selected aircraft component.

10. The method of claim 9, further comprising:
    sensing a temperature of the fuel cell stack;
    sensing a temperature of the radiator;
    sensing a temperature of the selected aircraft component; and
    operating at least one regulating valve of the manifold to, at least, decrease the second portions of the predetermined amount of compressed air to maintain the radiator within a predetermined temperature operating range of the radiator.

11. The method of claim 8, further comprising:
    sensing a temperature of the fuel cell stack;
    sensing a temperature of the radiator; and
    sensing a temperature of a selected aircraft component.

12. The method of claim 8, further comprising operating at least one regulating valve of the manifold to, at least, decrease the second portion of the predetermined amount of compressed air to maintain the radiator within a predetermined temperature operating range.

13. The method of claim 8, further comprising operating a manifold fan to increase a flow rate of the second portion of the predetermined amount of air.

14. The method of claim 8, further comprising cooling the radiator via the second portion of the predetermined amount of compressed air.

15. The method of claim 9, further cooling the selected aircraft component via the third portion of the predetermined amount of compressed air.

16. An integrated hydrogen-electric engine comprising:
    a compressor system configured to compress air;
    a hydrogen fuel source;
    a fuel cell stack;
    a heat exchanger in fluid communication with the hydrogen fuel source and the fuel cell stack;
    a radiator coupled to at least one of the heat exchanger or the fuel cell stack;
    an elongated shaft supporting the compressor system, the fuel cell stack, and the heat exchanger;
    a motor assembly disposed in electrical communication with the fuel cell stack; and
    a manifold in fluid communication with the compressor system, the manifold configured to direct a first portion of compressed air from the compressor system to the fuel cell stack and transport a second portion of compressed air directly from the compressor system to the radiator for removing heat from the radiator.

17. The integrated hydrogen-electric engine of claim 16, wherein the manifold includes a plurality of conduits, at least one conduit of the plurality of conduits is configured to direct a portion of air towards the radiator to enable cooling thereof.

18. The integrated hydrogen-electric engine of claim 16, further comprising at least one sensor configured to monitor a temperature of the radiator.

19. The integrated hydrogen-electric engine of claim 16, further comprising at least one regulating valve in fluid communication with the manifold, the at least one regulating valve configured to, at least, decrease the second portion of the compressed air.

20. The integrated hydrogen-electric engine of claim 19, further comprising a controller having a processor and a memory with instructions stored thereon, which, when executed by the processor, senses a temperature of the radiator and operate the at least one regulating valve based on the sensed temperature to, at least, decrease the first second portion of the predetermined amount of compressed air to maintain the radiator within a predetermined temperature operating range of the radiator.

* * * * *